United States Patent [19]

Jaffe et al.

[11] Patent Number: 4,920,429

[45] Date of Patent: Apr. 24, 1990

[54] EXPOSURE COMPENSATION FOR A LINE SCAN CAMERA

[75] Inventors: Robert S. Jaffe, Shenorock; Mark A. Lavin, Katonah; Rick A. Rand, Somers; Paul Schreiner, New York, all of N.Y.

[73] Assignee: International Business Machines, Armonk, N.Y.

[21] Appl. No.: 301,622

[22] Filed: Jan. 24, 1989

[51] Int. Cl.⁵ .............................................. H04N 1/40
[52] U.S. Cl. .................................... 358/471; 358/486; 358/496
[58] Field of Search ............... 358/228, 497, 486, 471, 358/496

[56] References Cited

U.S. PATENT DOCUMENTS

| | | | |
|---|---|---|---|
| 3,743,771 | 7/1973 | Ohta et al. | 358/174 |
| 3,833,762 | 9/1974 | Gudmundsen | 250/578 |
| 4,360,833 | 11/1982 | Kinoshita et al. | 358/213 |
| 4,396,950 | 8/1983 | Roth | 358/213 |
| 4,399,554 | 8/1983 | Perkins, III et al. | 382/8 |
| 4,525,741 | 6/1985 | Chahal et al. | 358/174 |
| 4,591,727 | 5/1986 | Gaebelein et al. | 250/578 |
| 4,613,936 | 9/1986 | Ataman et al. | 358/447 |
| 4,651,226 | 3/1987 | Motoori et al. | 358/497 |
| 4,668,982 | 5/1987 | Tinnerino | 358/101 |
| 4,679,075 | 7/1987 | Williams et al. | 358/106 |
| 4,763,200 | 8/1988 | Nakatani et al. | 358/497 |

*Primary Examiner*—Edward L. Coles, Sr.
*Attorney, Agent, or Firm*—Perman & Green

[57] ABSTRACT

A scanning imager is described which includes a line camera and a table to mechanically present successive regions of an item to be imaged. The time of exposure of the camera for each successive region presented is controlled by encoding strips connected to the table. Thus, if the table is subjected to motion variations, the encoding strips are likewise affected and vary the exposure time for each analog image pixel scan. To compensate, an exposure correction system is provided which includes an analog voltage generator whose output is related to each successive region exposure time. An A to D conversion circuit is responsive to the analog voltage to normalize the analog image value from the camera so that, in effect, equal exposure images result.

9 Claims, 2 Drawing Sheets

EXPOSURE COMPENSATION FOR A LINE SCAN CAMERA

FIELD OF THE INVENTION

This invention relates to scanning imagers and more particularly to a system for compensating for differing exposure times in succeeding image scans.

BACKGROUND OF THE INVENTION

Line scanning cameras are well known in the art and have found a number of applications, ranging from document inspection to automated device inspection for quality control purposes. In the latter application, especially with respect to electronic components, there is often a requirement to scan the physical characteristics of a microminiature circuit substrate and its circuit features (e.g., via holes, conductor lines, land areas, etc.). Because of the very dense and miniature configurations being examined, a great number of line scans are required to obtain the necessary feature definition. If the item being scanned contains a number of gray scale levels, they must be accurately portrayed in the final image for the inspection system to be effective. Additionally, in order to prevent the inspection process from taking an inordinately long period of time, the scan process must be carried out at a relatively rapid rate to achieve a reasonable product throughput.

A problem with line scan camera systems results from speed variations of the mechanical means used to provide relative motion between the camera and the workpiece being inspected. When a line scan camera, such as a CCD camera, is employed, the control for the initiation of the scan generally is derived from the mechanical means itself (e.g., a positional encoder attached to an x y table). Such means are often moved under control of a motor or other movement device which is subject to speed variations, jitter or other perturbations. When fine scans are being obtained, these movement variations cause changes in the camera exposure times and thereby result in succeeding lines of the image having different gray scale values. These make automated interpretation difficult. For instance, when very fine pixel (picture element) images are required, if the amplitude of vibration in the movement device approaches the order of a fifth of a pixel size, the derived gray scale level can vary on the order of plus or minus twenty percent.

Others have attempted to cope with this problem in less demanding applications. For instance, in U.S. Pat. No. 4,591,727 to Gaebelein, et al and assigned to the same assignee as is this application, a document scanner is described wherein an exposure time problem exists. Gaebelein teaches measuring the time between exposure pulses through the use of a digital counter, whose count is then employed in a multiplication which compensates for the exposure variation. Since however, Gaebelein's compensation is by multiplication of the digital data word after analog to digital conversion, the accuracy of the compensation is limited to discrete correction levels. For instance, if a one out of 15 analog to digital correction scale is employed, quantization errors of approximately seven percent occur (i.e., one part in fifteen). As fewer levels are used, the quantization error increases.

Another method of attempting to correct the problem is taught by Roth in U.S. Pat. No. 4,396,950. In lieu of attempting to correct the exposure variations as taught by Gaebelein, Roth normalizes his camera output by forcing its exposure time to be constant, but smaller than the shortest scanning interval. This solution obviously limits the efficiency of the system and causes useful exposure time, which would otherwise be available, to be eliminated.

Accordingly, it is an object of this invention to provide an exposure compensation system for a line scanning camera which is both accurate, efficient and simple in construction.

It is another object of this invention to provide a line scanning camera whose output gray scale levels exhibit constant characteristics from scan to scan.

SUMMARY OF THE INVENTION

A scanning imager is described which includes a line camera and means to mechanically present successive regions of an item to be imaged. The time of exposure of the camera for each successive region presented is controlled by initiation means connected to the presentation means. Thus, if the presentation means is subjected to motion variations, the initiation means is likewise affected and varies the exposure time for each analog image pixel scan. To compensate, an exposure correction system is provided which includes means for generating an analog voltage related to each successive region exposure time. Conversion means are provided which are responsive to the analog voltage to normalize the analog image value from the camera so that, in effect, equal exposure images result.

DETAILED DESCRIPTION OF THE INVENTION

Figure 1:
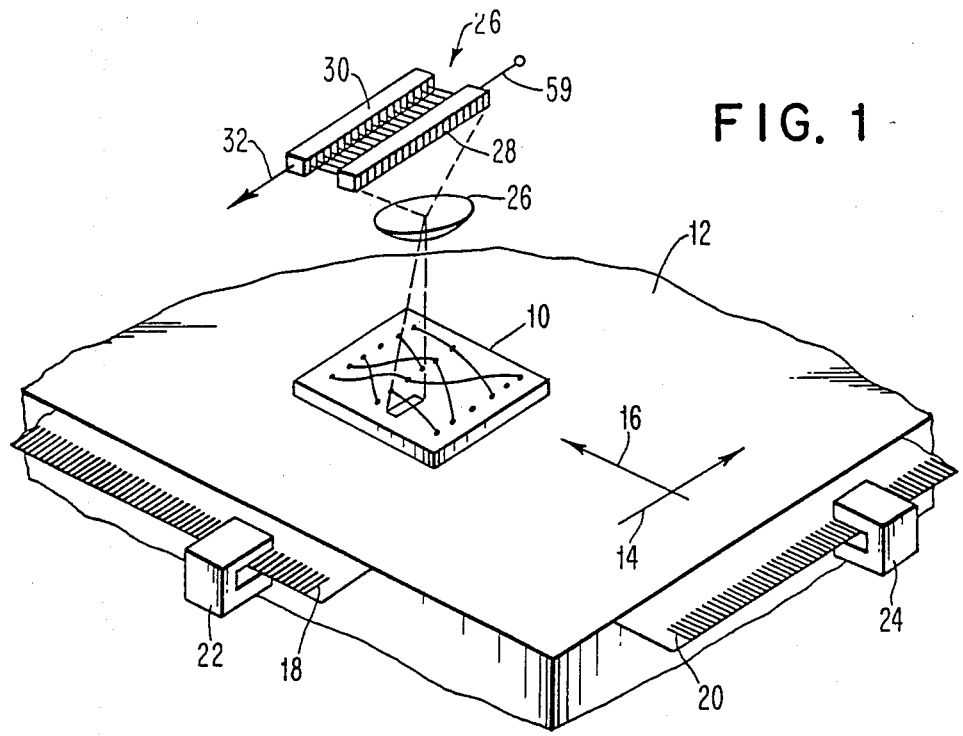
FIG. 1 is a perspective view of a scanning imager.

Referring now to FIG. 1, an object, such as multilayer circuit substrate 10 is fixedly mounted on table 12. The surface of substrate 10 has a multiplicity of interconnected circuit lines and via-holes which are to be imaged through the operation of the invention. Table 12 is, in turn, mounted for movement in both the x and y directions 14 and 16 respectively, by actuator means (not shown). Encoding strips 18 and 20 are respectively mounted on the edges of table 12 and provide the necessary encoding signals to enable determination of the position of table 12. Opto-electric detectors 22 and 24 respectively detect the movement of encoding strips 18 and 20 and provide control signals indicative of the relative movement therebetween. In the forthcoming discussion, it will be assumed that table 16 moves, in the main, along y axis 16. In that case, the encoding indicia sensed by detector 22 provide the initiating function for the operation of the CCD camera (to be hereinafter described).

Encoding strips 18 and 20 are preferably highly stable substrates (e.g., glass) which have very finely spaced parallel lines etched thereon, which lines provide precise position indication. Notwithstanding the preciseness of the intended indications, table 12 and its motive means are subject to speed variations, vibrations, etc. which cause variations in the time between the pulse outputs emanating from sensor 22 (even though table 12 is programmed to move at a constant rate). It is those variations which create the subsequent variations in exposure which this invention is designed to overcome.

A line-CCD camera is schematically indicated at 26 and receives an image from the top of substrate 10 through lens 28. While shown only schematically, a line-CCD camera is generally enclosed in an integrated circuit-type package with a ground and polished window between it and imaging lens 28. Camera 26 comprises a plurality of photodiodes 28, each with an associated capacitance. The outputs from photodiodes 28 are fed, in parallel, to an analog CCD shift register 30 for serial readout via line 32.

Figure 2:
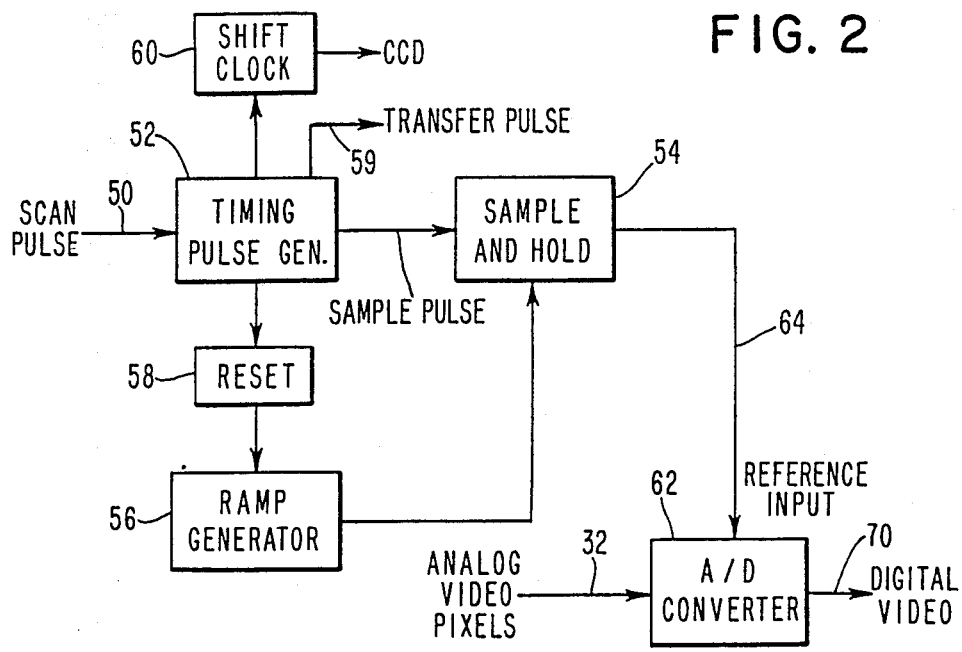
FIG. 2 is a block diagram of an exposure correction system configured in accordance with the invention.

As is well known, a CCD line camera receives light from the area being imaged and converts it to electric charge, which charge is integrated and stored on a diode capacitance until readout. If the length of exposure time between successive images varies, the amount of stored charge similarly varies so that when the charges are transferred to the CCD shift register and then clocked out, the light level (i.e. voltage) of the subsequent signal is affected by the variation in exposure time. Turning now to FIG. 2 in conjunction with FIG. 1, a block diagram is shown of the circuit employed to correct for varying exposure between line scans. The operation of the circuit starts with an output from encoder 22 termed a "scan" pulse, which pulse is applied via conductor 50 to timing pulse generator 52. In response to the scan pulse, timing pulse generator 52 provides a plurality of outputs which initiate the operation of other portions of the circuit. Further description of the circuit of FIG. 2 will be made in conjunction with the waveform diagrams of FIGS. 3 and 3a.

The receipt of a scan pulse 100 (FIG. 3a) causes timing pulse generator to issue a sample pulse 102 to sample and hold circuit 54. In response, sample and hold circuit 54 senses the output voltage from ramp generator 56 (e.g., waveform 104) and stores that voltage as a level 106. At the termination of sample pulse 102, timing pulse generator 52 generates reset pulse 108 which causes reset circuit 58 to re-initiate the ramp output of ramp generator 56 (e.g., see waveform 110 in FIG. 3).

Thus, the output of ramp generator 56 is reset to zero at each scan pulse, and re-initiates its ramp output. Since the output of ramp generator 56 is a linearly increasing voltage, the level stored by sample and hold circuit 54 is directly proportional to the time (t1, t2, etc.) between succeeding scan pulses.

Figure 3:
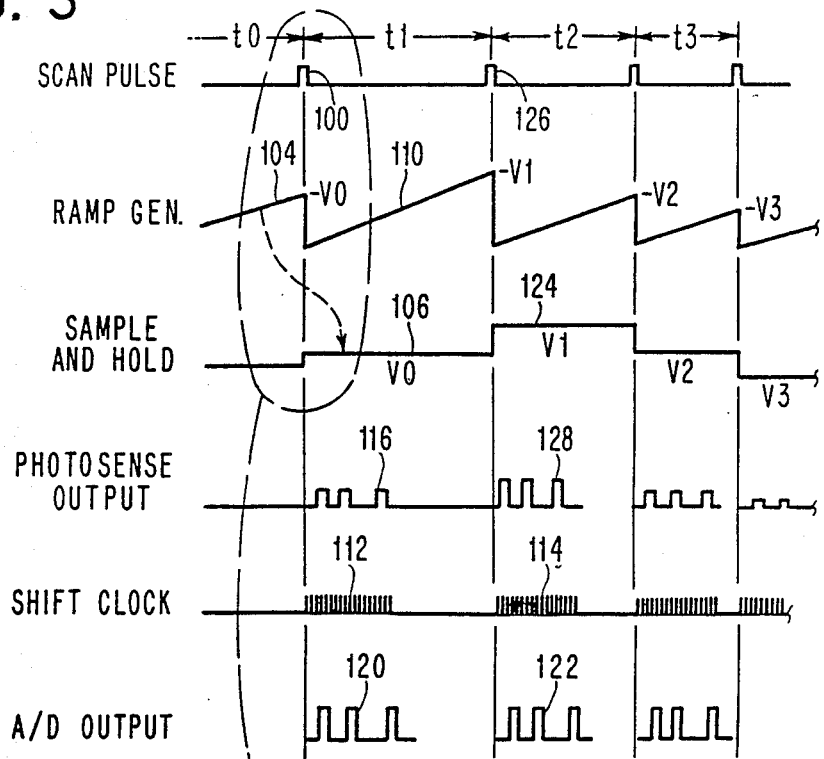
FIG. 3 is a waveform diagram helpful in understanding the operation of FIG. 2.
Figure 3A:
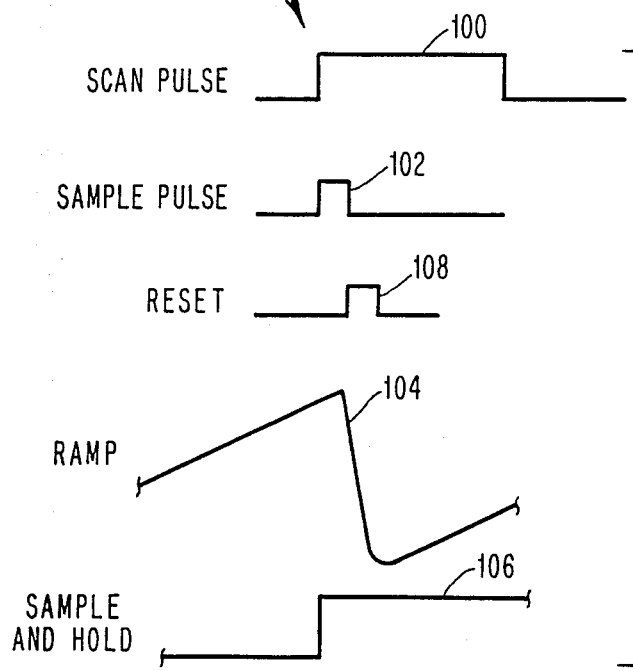
FIG. 3a is an expanded version of a portion of the waveform diagram of FIG. 3, showing the relationships between certain signals present therein.

During the interval t0 (in FIG. 3), photodiodes 28 store charge as a result of the scene being imaged thereon. At scan pulse 100, timing pulse generator 52 generates a transfer pulse output on line 59 which causes the stored charge to be transferred from photodiodes 28 to CCD array 30. Simultaneously, a pulse is applied to shift clock 60 to cause the data in CCD array 30 to be serially shifted out. The output of shift clock 60 is shown in FIG. 3 as series of pulses 112, 114, etc. Each such pulse causes a single pixel to emerge from CCD array 30 on line 32. It should be noted, that clock pulses 112 cause the pixel images obtained during interval t0 to be shifted out of CCD array 30 during t1.

For the sake of explanation, it will be assumed that pulse-like image 116 is shifted out of CCD array 30 on line 32. As will be understood, stored voltage level 106 in sample and hold circuit 54 is used in the processing of pulse image 116. The pixels making up image 116 are applied via line 32 (in FIG. 2) to analog to digital converter 62. The sampled voltage level 106 is applied to the reference input of A to D converter 62 from sample and hold circuit 54 via conductor 64. Thus, as each analog pixel arrives on conductor 32, the reference voltage used by A to D converter 62 in its conversion process is voltage level 106. In effect, this creates a "normalization" of the analog video pixels as they are digitized. The digital outputs are then fed via output conductor 70 to an appropriate display and/or image processor/analyzer. Those outputs are indicated in FIG. 3 as pulses 120, 122, etc. Because interval t1 is longer than interval t0, the output of ramp generator 110 during t1 builds to a higher level than during t0. That ramp level is sampled and held as voltage V1 (Level 124). This indicates that the exposure time t1 (between scan pulse 100 and succeeding scan pulse 126) is longer than the previous scan time and, thus, a longer exposure time resulted. The photosensed output signals 128 have a substantially higher level output and may be thought of as "brighter" than output pulses 116. Nevertheless, when level 124 is applied to the reference input of A to D converter 62, the output thereafter appearing on line 70 is effectively normalized since the digital conversion process commences from a higher DC level than the previous sample cycle. For each succeeding exposure, the output digital video is normalized by the voltage held in sample and hold circuit 54, so that all digital outputs have an equilibrated brightness level.

It is to be understood that the above-described embodiments of the invention are illustrative only and that modifications throughout may occur to those skilled in the art. Accordingly, this invention is not to be regarded as limited to the embodiments disclosed herein, but is to be limited as defined by the appended claims.

We claim:

1. In a scanning imager which includes a line camera and motive means to present successive regions of an item to be imaged to said line camera, initiation means associated with said motive means for controlling time of exposure of said camera for each said region, said initiation means subject to motion variations of said motive means to vary the time between successive operations of said camera and exposure times for successive regions, thereby producing analog image pixel outputs exhibiting exposure variations, an exposure correction system comprising:
   means responsive to a signal from said initiation means for generating a signal related to the time between successive operations of said camera; and
   conversion means responsive to said signal to normalize said analog image pixel outputs.

2. The invention as defined in claim 1 wherein said conversion means is an analog to digital converter means whose reference input is derived from said analog voltage.

3. The invention as defined in claim 2 wherein said means for generating comprises:
   ramp generation means for generating a linearly increasing ramp voltage having a termination level proportional to a region exposure time.

4. The invention as defined in claim 3 wherein said initiation means comprises encoding markings associated with said motive means, each said encoding marking causing the generation of a scan signal which causes the commencement of an exposure by said camera.

5. The invention as defined in claim 4 wherein each said encoding marking generates a signal which causes initiation of said ramp voltage by said ramp generation means, the invention further comprising:

sample and hold means responsive to a signal derived from an encoding marking, to sample and store a level of said ramp voltage, the generation of said ramp voltage being commenced by a signal from a previously sensed encoding marking.

6. The invention as defined in claim 5 wherein said sampled and stored voltage is applied as a reference input to said analog to digital converter means, whereby the digital conversion of said pixel outputs is normalized with respect to said sampled and stored voltage.

7. The invention as defined in claim 6 wherein said motive means is an x-y table and said encoding markings are encoding strips fixedly attached to said x-y table.

8. The invention as defined in claim 7 wherein said line camera is a charge-coupled device imager.

9. The invention as defined in claim 8 further comprising:

a timing pulse generator for generating control signals in response to a sensed encoding stripe, one said control signal causing initiation of said ramp voltage, another said control signal causing the operation of said charge coupled device imager and still another causing operation of said sample and hold means.

* * * * *